United States Patent

[11] 3,550,705

[72] Inventor Ernest G. Hoffman
    Hamden, Conn.
[21] Appl. No. 882,932
[22] Filed Dec. 8, 1969
[45] Patented Dec. 29, 1970
[73] Assignee Veeder Industries Inc.
    Hartford, Conn.
    a corporation of Connecticut

[54] WEIGHING SCALE READOUT DEVICE
    12 Claims, 6 Drawing Figs.
[52] U.S. Cl...................................................... 177/210,
    177/230
[51] Int. Cl...................................................... G01g 23/37,
    G01g 7/02, G01g 23/26
[50] Field of Search............................................
    177/Digitizers B Digest, Magnets Digest, 210, 230,
    3, 25

[56] References Cited
    UNITED STATES PATENTS
2,141,236 12/1938 Benedict ...................... 177/210X
2,664,557 12/1953 Sargrove ........177/Digitizers B Digest
3,163,247 12/1964 Bell et al............. .......... 177/3
3,268,020 8/1966 Puechberty .................. 177/210

Primary Examiner—Robert S. Ward, Jr.
Attorney—Purtzman, Hayes, Kalb and Chilton

ABSTRACT: A bathroom scale with a pacing disc rotatable by an electric motor in accordance with the angular displacement of the readout disc of a conventional bathroom scale weighing mechanism. The motor is pivotally mounted to engage the followup disc and to close a first motor control switch when a person stands on the scale weighing platform, and a second motor control switch mounted on the pacing disc and connected in series with the first motor control switch is operated by an upstanding switch operator mounted on the readout disc, and the readout and pacing discs rotate together to maintain the second motor control switch closed until the discs reach a position corresponding to the applied weight. In one embodiment an electromagnetic counter positioned at eye level above the weighing platform is electrically connected to be indexed to register the applied weight by a pulse generator comprising a switch and a switch operating cam mounted on the motor shaft. In a second embodiment a counter is mechanically driven by the pacing disc.

PATENTED DEC 29 1970
3,550,705
SHEET 1 OF 2
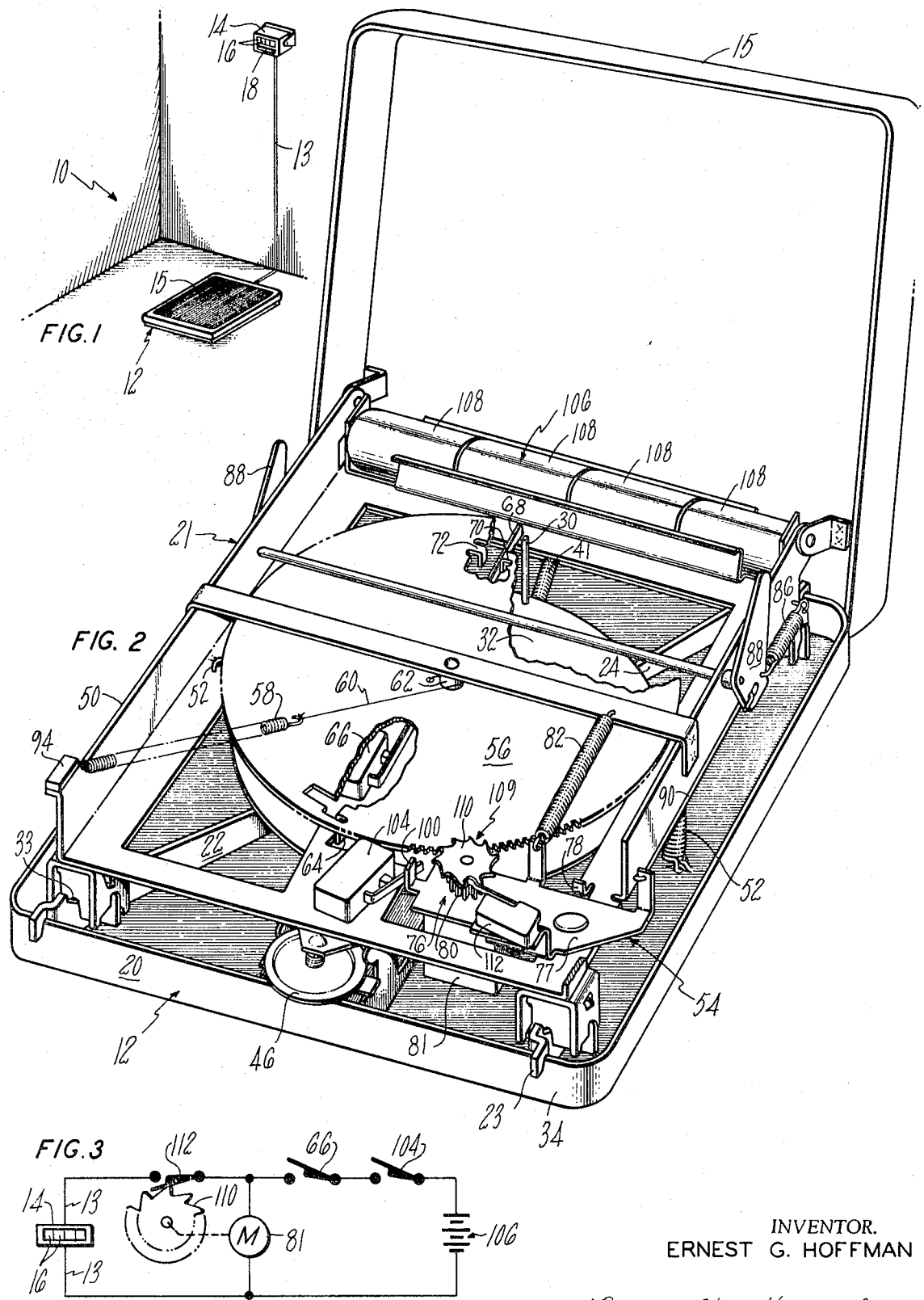
INVENTOR.
ERNEST G. HOFFMAN
BY Prutzman, Hayes, Kalb and Chilton
ATTORNEYS

WEIGHING SCALE READOUT DEVICE

BRIEF SUMMARY OF THE INVENTION

The present invention relates generally to weighing scales and more particularly to a hew and improved weight readout device for weighing scale.

It is a principal aim of the present invention to provide a new and improved weight readout device for a bathroom scale.

It is another aim of the present invention to provide a new and improved bathroom scale having a battery powered weight register.

It is a further aim of the present invention to provide a new and improved bathroom scale having a weight register adapted to retain a weight reading and to be selectively reset to zero.

It is a further aim of the present invention to provide a new and improved weight readout device for a conventional bathroom scale weighing mechanism.

It is a further aim of the present invention to provide a new and improved weighing device with a remote weight register.

It is another aim of the present invention to provide a new and improved weight readout device for a bathroom scale having a compact and economical construction and providing reliable operation over a long service-free life.

Other objects will be in part obvious and in part pointed out more in detail hereinafter.

A better understanding of the invention will be obtained from the following detailed description and the accompanying drawings of illustrative applications of the invention.

BRIEF DESCRIPTION OF THE DRAWINGS

In the drawings:

FIG. 1 is an isometric view of a bathroom scale incorporating an embodiment of a scale readout device of the present invention;

FIG. 2 is an enlarged isometric view, partly broken away and partly in section, of a platform assembly of the bathroom scale with its weighing platform in a raised pivotal position;

FIG. 3 is a generally schematic illustration showing the electrical circuit of the bathroom scale;

DESCRIPTION OF THE PREFERRED EMBODIMENTS

Figure 4:
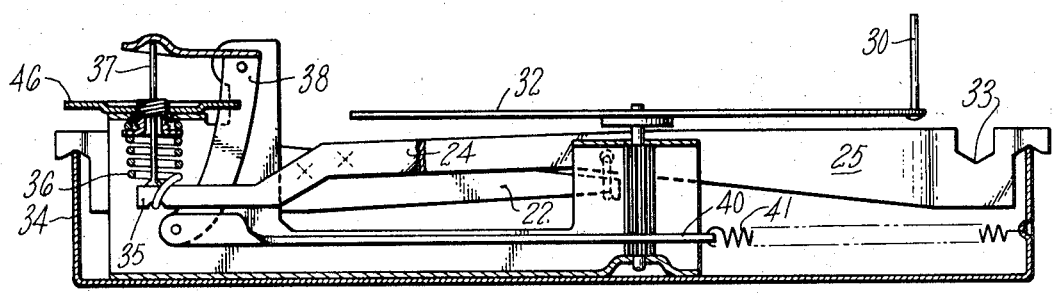
FIG. 4 is an enlarged elevation section view, partly broken away and partly in section, of a base subassembly of the platform assembly.

Referring to the drawings in detail, wherein like reference numerals indicate like parts throughout the several figures, and referring particularly to FIGS. 1—4, a bathroom scale 10 incorporating an embodiment of a scale readout device of the present invention is shown comprising a platform assembly 12, and a remote electromagnetic counter 14 connected by a lead 13 to the platform assembly to register the weight, for example of a person standing on a weighing platform 15 of the platform assembly. The counter 14 comprises a plurality of coaxial counter wheels 16 and a suitable electromagnetic actuator (not shown) operably by a train of low voltage electrical pulses. The counter 14 is adapted to retain its weight registration and may be selectively reset to zero by manually depressing a reset bar 18.

The platform assembly 12 comprises a base subassembly 20 and a cover subassembly 21 which is supported upon four weighing levers 22—25 of the base subassembly 20. The base subassembly 20 may be of conventional construction, for example as shown in U.S. Pat. No. 2,875,999 of Mike A. Provi et al. entitled "Bathroom Scale" and dated March 3, 1959, excepting that an upstanding switch actuator rod 30 is provided on the usual readout disc 32.

Briefly, the weighing levers 22—25 have V-shaped slots 33 for receiving and supporting the cover subassembly 21, and one end of each of the weighing levers 22—25 is supported on the edge of the base pan 34 and their other ends are suitably interconnected to collectively bias a lever arm 35 downwardly against the bias of a coil spring 36 in accordance with the weight on the weighing platform 15. A followup linkage comprising an upstanding pin 37, bellcrank 38, rack 40 and tension spring 41 provides for angularly displacing the readout disc 32 in the counterclockwise direction as viewed in FIG. 2, from its established "zero" or no weight position shown in FIG. 2 in proportion to the weight on the weighing platform 15, and an adjusting knob 46 is provided for setting the zero position of the disc 32.

The cover subassembly 21 comprises a generally rectangular frame 50 which is supported in the four V-shaped slots 33 on the weighing levers 22—25, and suitable retaining springs 52 are provided for retaining the frame 50 in assembled relationship with the base subassembly 20. A counterdrive mechanism 54 is supported on the frame 50 and the weighing platform 15 is pivotally mounted on the frame 50 to provide access to the counterdrive mechanism 54 and the adjusting knob 46.

The counterdrive mechanism 54 comprises a gear or disc 56 mounted on the frame 50 for rotation substantially coaxially with the disc 32. The disc 56 is angularly biased, in the clockwise direction as viewed in FIG. 2, by a return tension spring 58 via a cord 60 wrapped partly around a stub shaft 62 of the disc 56 and connected to the disc. The disc 56 is formed with a depending tang 64 engageable with the frame 50 to provide a stop for establishing the zero position of the disc.

A control switch 66 having a flexible generally radially extending cantilever type operating arm 68 is mounted on the underside of the disc 56, and the disc 56 is provided with depending tangs 70, 72 to limit the movement of the switch arm 68 between its normal or open position in engagement with the stop 70 and its closed position in engagement with the stop 72. The switch 66 is preferably a snap-acting overcenter switch which snaps closed just prior to engagement of the switch arm 68 with the stop 72 and snaps open just prior to engagement of the arm 68 with the stop 70.

As seen in FIG. 2, the actuator rod 30 is mounted for engagement with the switch arm 68 to operate the switch 66 in accordance with the relative angular positions of the discs 32 and 56. The disc 32 is preferably zeroed (by the adjustment knob 46) so that the actuator rod 30 is positioned in contact with the switch arm 68 with the arm 68 in engagement with the stop 70 as shown in FIG. 2.

A drive assembly 76 having a support plate 77 is pivotally mounted on the frame 50, and a tension spring 82 is adapted to pivot the plate 77 to an operative position determined by the stop 78 to provide for engagement of a gear 80 driven by a motor 81 with the gear 56 for rotating the gear 56, in the counterclockwise direction as viewed in FIG. 2. The drive assembly 76 is maintained in its withdrawn pivotal position shown in FIG. 2 when there is no weight on the weighing platform 15, for which purpose there are provided a pair of tension springs 86 which act through levers 88 and rod 90 for retracting the support plate 77. The upper tapered ends of the levers 88 are contoured to engage the underside of the weighing platform 15 and hold the weighing platform 15 a short distance above its forward supports 94 so that when someone steps onto the weighing platform 15, the platform 15 will pivot the levers 88 downwardly against the bias of the tension springs 86 to permit the drive assembly 76 to be pivoted inwardly by the spring 82 to engage the gears 80, 56 and to close a control switch 104 with an upstanding tang 100 on the support plate 77.

A battery pack 106 having four batteries 108 is mounted along the forward edge of the frame 50, and the battery pack 106, motor 81 and control switches 66, 104 are connected in series as shown in FIG. 3 to provide for selectively operating the motor 81. Thus, when someone steps onto the weighing platform 15 (a) the drive assembly 76 will be pivoted to engage the gears 80, 56 and to close the control switch 104; (b) the readout disc 32 will be rotated by the tension spring 41, in the counterclockwise direction as viewed in FIG. 2, to close the switch 66; and (c) the motor 81 will be energized to rotate the disc 56, in the counterclockwise direction as viewed in FIG. 2. The readout disc 32 and rod 30 will follow the disc 56 (which thereby functions to pace the rotation of the readout disc 32) to maintain the switch 66 closed until the disc 32 reaches an angular position corresponding to the weight on the weighing platform 15. The disc 56 will be rotated by the motor 81 a few degrees further until the switch arm 68 is permitted to move sufficiently to open the switch 66 and thereby deenergize the motor 81. Consequently the disc 56 will be angularly displaced from its zero position by the motor 81 in proportion to the weight on the weighing platform 15.

A pulse generator 109 comprising a motor driven switch cam 110 and a switch 112 is provided for generating a pulse train having a number of pulses corresponding to the angular displacement of the disc 56. Preferably the cam 110 is contoured to generate an electrical pulse for each pound of weight on the weighing platform, and for example for each 1° of displacement of the disc 56, and the counter 14 is adapted to be indexed one count for each electrical pulse so that the counter 14 will register the applied weight to the nearest pound. Also, the motor 81 preferably operates at a speed sufficient to provide full scale travel (for example 300°) of the disc 56 within a few seconds. As a result adequate time would be provided for the weighing levers 22—25 to stabilize while the disc 56 is being rotated by the motor 81, and the discs 32, 56 would accordingly be rotated to the appropriate angle corresponding to the applied weight without overtravel.

When a person being weighed steps off the weighing platform 15, the disc 32 will be returned to its zero position by the spring 36 and the drive assembly 76 will be withdrawn to open the control switch 104 and to permit the disc 56 to be returned to its zero position by the tension spring 58. However, the counter will retain the weight readout and can be selectively reset to zero by the reset bar 18 as desired.

Figure 6:
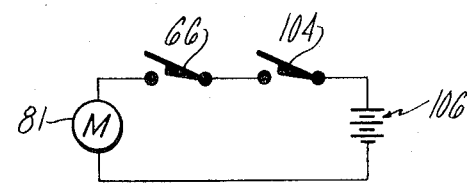
FIG. 6 is a schematic illustration of the electrical circuit of the embodiment of FIG. 5.
Figure 5:
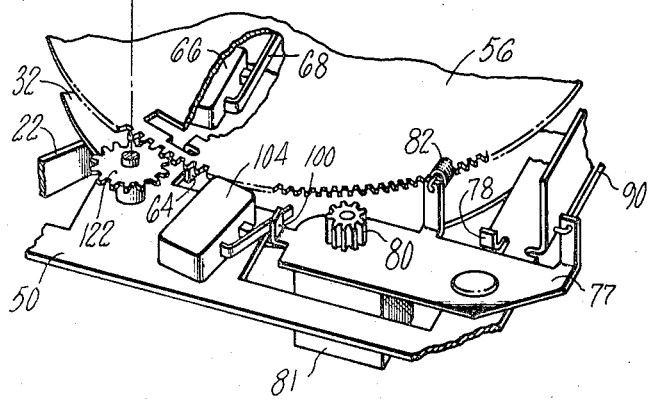
FIG. 5 is a combined schematic illustration and isometric view, partly broken away and partly in section, showing a modified embodiment of the scale readout device.

A modified embodiment of the scale readout device is shown in FIGS. 5 and 6 in which a suitable counter 120 is mechanically driven by the disc 56 via a gear 122 and a suitable drive shaft or cable 124 to register the applied weight. Accordingly the counter 120 will be mechanically indexed by the disc 56 to register the weight on the weighing platform as the disc is rotated by the motor 81. Also, when the disc 56 returns to its zero position the counter 120 will be indexed in the subtractive direction to zero, for which purpose a suitably strong return spring for the disc 56 is employed.

As will be apparent to persons skilled in the art, various modifications, adaptations and variations of the foregoing specific disclosure can be made without departing from the teachings of the present invention.

I claim:

1. In a weighing scale having a weighing mechanism and a rotary output connected to be angularly displaced in one angular direction from a zero angular position thereof in proportion to the weight applied to the weighing mechanism, the improvement wherein the scale comprises a readout device having a readout controller rotatable substantially coaxially with said rotary output, disengageable controller drive means operable for rotating the controller from a zero angular position thereof in said one angular direction, return spring means for rotating the readout controller in the opposite angular direction to its zero angular position, a readout counter, counterdrive means for indexing the counter in proportion to the angular displacement of the rotary controller in said one angular direction from its zero angular position, and control means for engaging the disengageable drive means for rotating the controller from its zero angular position in said one angular direction in accordance with the angular displacement of the rotary output from its zero angular position.

2. A scale according to claim 1 wherein the weighing mechanism comprises a weighing platform for receiving the applied weight and wherein the control means is responsive to the application of weight to the weighing platform for engaging the disengageable controller drive means.

3. A scale according to claim 1 wherein the readout counter is an electromagnetic counter operable by electrical pulses and wherein the counter drive means comprises a pulse generator operable for generating a number of spaced electrical pulses in accordance with the angular displacement of the rotary controller from its zero angular position.

4. A scale according to claim 3 wherein the pulse generator comprises a rotary cam connected to be rotated in proportion to the angular displacement of the rotary controller and a pulsing switch operable by the cam to generate electrical pulses as the cam rotates.

5. A scale according to claim 1 wherein the disengageable drive means is operable for engaging and disengaging the counterdrive means in conjunction with the engagement and disengagement of the controller drive means respectively.

6. A scale according to claim 1 wherein the controller drive means comprises an electrical drive motor.

7. A scale according to claim 6 wherein the drive control means comprises a first motor control switch for the drive motor and switch operating means for operating the switch in conjunction with the engagement of the controller drive means.

8. A scale according to claim 7 wherein the drive control means comprises a second motor control switch connected in series with said first motor control switch and operable in accordance with the relative angular positions of the rotary output and readout controller.

9. A scale according to claim 6 wherein the drive control means comprises a motor control switch operable in accordance with the relative angular positions of the rotary output and readout controller for selectively energizing the motor.

10. A scale according to claim 9 wherein the motor control switch is mounted on the readout controller and wherein the drive control means comprises a switch actuator mounted on the rotary output for operating the motor control switch.

11. A scale according to claim 10 wherein the weighing mechanism comprises second spring means for angularly displacing the rotary output in said one angular direction from its zero position, wherein the rotary controller is adapted to restrain the rotary output against the bias of said second spring means, and wherein the second spring means operates to rotate the rotary output to actuate the motor control switch upon the application of weight to the weighing mechanism.

12. In a weighing scale having a weighing mechanism with a rotary output connected to be angularly displaced in one angular direction from a zero angular position thereof in proportion to the weight applied to the weighing mechanism, the improvement wherein the scale comprises a readout device having a readout controller rotatable substantially coaxially with said rotary output, controller drive means operable for rotating the controller from a zero angular position thereof in said one angular direction, an electromagnetic readout counter, a pulse generator operable for generating a train of pulses in accordance with the angular displacement of the rotary controller from its zero angular position, and control means for operating the controller drive means to rotate the controller from a zero angular position thereof in said one angular direction in accordance with the angular displacement of the rotary output from its zero angular position, and for operating the pulse generator in conjunction therewith.